Sept. 5, 1939.                J. MIHALYI                2,172,339
                         PHOTOGRAPHIC CAMERA
                       Filed Sept. 30, 1937        2 Sheets-Sheet 1
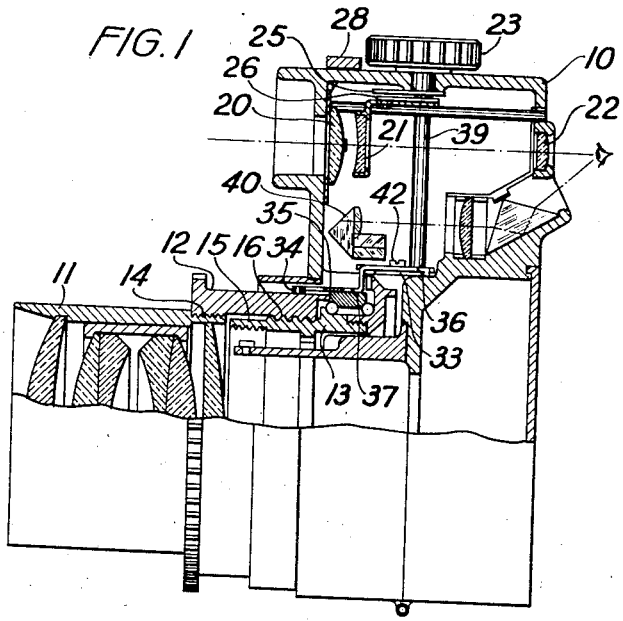
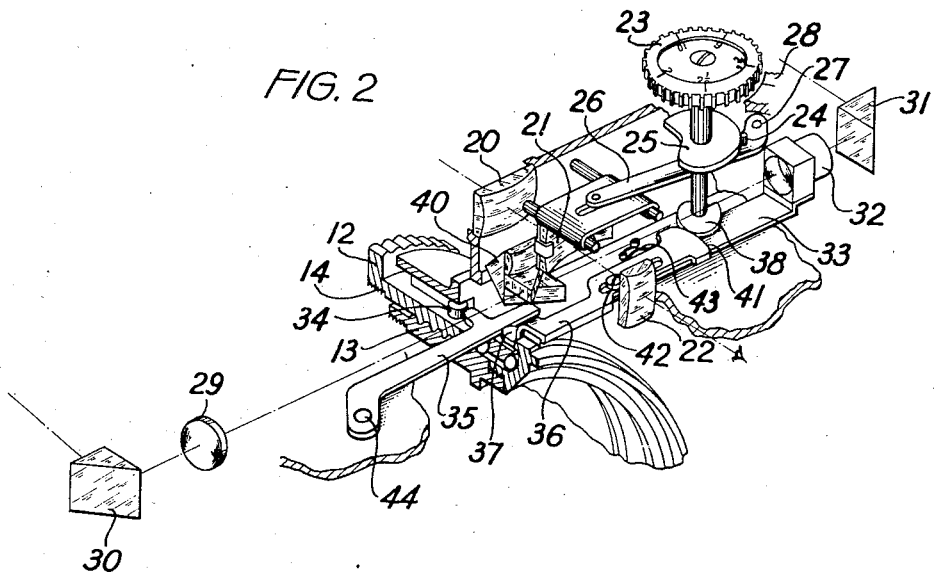
Joseph Mihalyi
INVENTOR
BY Newton N. Perrins
   Rolla N. Carter
         ATTORNEYS Sept. 5, 1939.  J. MIHALYI  2,172,339
PHOTOGRAPHIC CAMERA
Filed Sept. 30, 1937  2 Sheets-Sheet 2
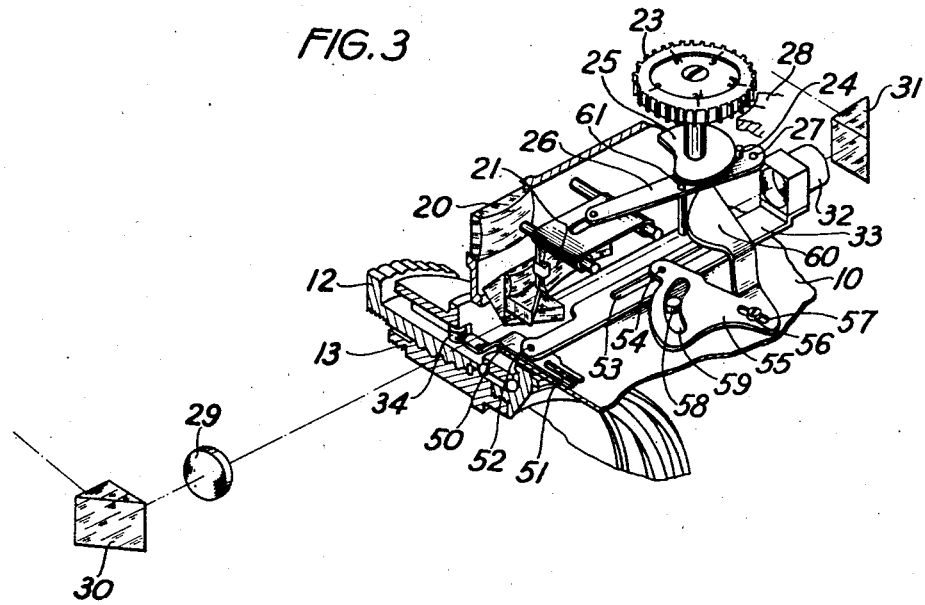
Joseph Mihalyi
INVENTOR
Newton M. Perrins
BY Holla H. Carter
ATTORNEYS Patented Sept. 5, 1939

2,172,339

UNITED STATES PATENT OFFICE 2,172,339

PHOTOGRAPHIC CAMERA

Joseph Mihalyi, Rochester, N. Y., assignor to Eastman Kodak Company, Rochester, N. Y., a corporation of New Jersey Application September 30, 1937, Serial No. 166,526

2 Claims. (Cl. 95—44)

This invention relates to photographic cameras and particularly to cameras adapted to receive interchangeable lenses.

In a previous patent application, Serial No. 95,374, filed August 11, 1936, now U. S. Patent 2,105,256, I have described an adjustable view finder in which the manually controlled movement of one of the lens components alters the field of view to correspond with different focal length objectives. A suitable scale marked in units of focal length, is provided on the control member.

In another application, Serial No. 95,375, also filed August 11, 1936, now U. S. Patent 2,124,885, I have described a camera having a range finder coupled to the camera focusing mechanism.

The general object of the present invention is to provide a camera having a control member which, when set to a reading corresponding to the focal length of the objective in use, adjusts both the view finder and the range finder, so that they perform their respective functions in proper relation to this focal length.

It is a particular object of the invention to provide a member suitably operated by the manual view finder control (mentioned above in connection with patent application Serial No. 95,374) which simultaneously adjusts the view finder and the coupling between the range finder and the camera focusing mechanism (the range finder being of the type described in patent application Serial No. 95,375).

In cameras of the objective focusing type and using interchangeable lenses, it is highly desirable that the rotary motion of the focusing member necessary to focus each lens throughout its particular complete range, be relatively large, i. e., equal to about 300 degrees of arc. Since a normal lens may cover a range from four feet to infinity and a telephoto lens from 25 feet to infinity, the 300° of rotation must necessarily cover two decidedly different ranges and, hence, the coupling between the focusing mechanism and a coincident type range finder must be changed in accordance with the focal length of the lens used. It is an object of the present invention to provide means for adjusting the coupling between the range finder and the focusing mechanism in accordance with various objectives. Thus, the invention provides the highly desirable feature mentioned above, namely, it permits the use of a focusing mechanism which rotates through 300 degrees of arc for adjusting any of the interchangeable lenses through its corresponding full range.

Other objects and advantages of the present invention will be apparent from the following description, when read in connection with the accompanying drawings, in which similar reference numerals refer to similar parts and in which:

Fig. 1 is an elevation in cross section of a camera incorporating one embodiment of the invention.

Fig. 2 is a perspective view of the important details of the embodiment shown in Fig. 1.

Fig. 3 is a perspective view of a preferred embodiment of the invention.

In Figs. 1 and 2, a camera having a casing 10 carries a detachable objective 11 mounted on a focusing sleeve 12 which is axially movable for focusing purposes. In the arrangement shown, the objective is attached to the focusing sleeve 12 by screw threads 14. In an alternative arrangement, lenses may be mounted directly on a focusing member 13 by means of screw threads 15 not connected to anything in the arrangement shown. The focusing member 13 is rotatable and, by means of a screw thread 16, causes the required axial motion of the focusing sleeve 12.

The camera is provided with a built-in view finder comprising a field lens 20, an eye piece 22, and an adjustable dispersive element 21, so mounted that axial movement thereof permits adjustment of the field of view to correspond to various focal length objectives. This adjustment is obtained by a control member 23 shown as a knob marked in units of focal length, which is adjusted by manual rotation until the corresponding scale marking comes opposite an index 28. This rotation is transmitted through an axle 39 to rotate a cam 25 which engages a pin 24 projecting from a lever 26 pivoted at the point 27. This lever 26 carries the view finder adjustable element 21 and provides the required control for this member 21.

The axial motion of the focusing sleeve 12 is transmitted through a pin 34 mounted thereon to a lever 35 pivoted at the point 44 and through another lever comprising relatively adjustable portions 36 and 33, pivoted at the point 42 and in contact with the lever 35 at the point 37, to adjust a range finder light deviating means 32, shown as a lens movable transversely of one of the range finder light beams. Conventional means shown as prisms 30 and 31 provide the two beams of the range finder and a lens 29 is included in one beam to balance the optical power of the lens used in the light deviating means 32.

According to the invention, this range finder light deviating means 32 is mounted on the portion 33 of the transmitting lever which comprises both this portion 33 and the adjustable portion 36 coupled to the portion 33 by means of a slot engaging the pivot 42 and turned down edges near the end 41 which grip the portion 33 as shown. A resilient member 43 shown as a spring urges the end 37 of the lever system into contact with the lever 35 and this lever 35 in turn into contact with the pin 34. Another resilient member, not shown, mounted in the slot in the portion 36 urges this portion to overlap the portion 33 as much as possible. An extension of the control knob axle 39 carries another cam 38 which engages the curved end 41 of the adjustable lever portion 36. Thus, rotation of the control knob 23 causes the portion 36 to move against the last mentioned resilient member, so that the pivot 42 slides in the slot therein and the end 37 moves along the lever 35. As the knob 23 is turned toward a scale setting corresponding to a longer focal length, the lever 36 is lengthened, thus providing a less sensitive coupling between the focusing sleeve 12 and the range finder light deviating means 32.

By way of explanation of the operation of this range finder system, it is pointed out that the adjustment of the light deviating means 32 to change from a positon corresponding to infinity to one corresponding to 25 feet say, is the same independent of the lens used on the camera. However, as pointed out above, it is highly desirable to use a greater rotary motion of the focusing member 13 and, of course, a greater axial motion of the focusing sleeve 12 to change from infinity to 25 feet when longer focal length lenses are used (e. g., lenses in which this change comprises their complete range). Thus, the invention provides, when longer focal length objectives are used, the coupling between the focusing sleeve 12 and the range finder light deviating means 32 is less sensitive as required.

The end 41 of the lever portion 36 must be curved so that the pivot 42 is its center of curvature and so that rotation of the lever during focusing does not introduce any lengthening or shortening of the leverage due to contact of the cam 38 and the surface 41 and, hence, any change in the range finder focusing mechanism coupling. However, when longer focal length objectives are used, this curve 41 no longer has the pivot 42 for its exact center of curvature and, hence, the point 37 is apt to move a very slight amount back and forth along the lever 35 during focusing of long focal length objectives. This error is very slight and, for most practical purposes is negligible, but, as shown in Fig. 3 can be easily eliminated entirely.

In Fig. 3, the coupling between the range finder light deviating means 32 and the focusing sleeve 12 comprises a small sliding member 50 in contact with the pin 34 and restrained to move longitudinally of the camera lens by pins and slot 51. I have found it convenient to introduce the resilient member necessary to urge the sliding member 50 into contact with the pin 34, in this slot 51. Many equivalent positions for the resilient member will suggest themselves.

According to this embodiment of the invention the lever 33 is connected directly to the sliding member 50 by means of a pin 52 about which there is a slight relative rotation of the two members during focusing. The lever 33 rotates on a fulcrum 54 which is not fixed, but slides in a groove 53 in the lever 33 and in another groove identical therewith and immediately below the lever 33 in the housing 10. This pivot 54 is carried by one arm 55 of a bell-crank lever pivoted at the point 56. This pivot 56 is secured to the housing 10 and passes through an elongated hole 57 which permits the arm 55 to rotate about the pivot 56 while the pin 54 is moving linearly along the slot 53 and not in an arc about this point 56. This arm 55 is maintained firmly by means of a pin 58 and an arcuate slot 59 as shown. It would be possible by very careful construction to have this arc 59 so shaped that motion of the pin 54 would be confined to a straight line as required, but I found it more convenient and more accurate to have the extra linear slot in the housing 10 corresponding to the slot 53 in the lever 33, as discussed above.

The arm 55 of the bellcrank lever is actuated by the other arm 60 thereof which is so shaped as to be above the range finder light beam and not to interfere therewith. This arm 60 carries a cam surface which engages a pin 61 mounted on the view finder adjusting lever 26. Thus, rotation of the control knob 23, in accordance with the index 28 rotates the cam 25 which, by engaging the pin 24, rotates the lever 26 about the point 27 and adjusts not only the view finder element 21, but also the pin 61 and hence rotates the bellcrank lever comprising the upper arm 60 and the lower arm 55, which carries the fulcrum 54 for the lever 33 of the range finder light deviating means 32.

Having thus described two embodiments of my invention in detail, I wish to point out that it is not limited to the specific structures shown, but is of the scope of the appended claims.

I claim:

1. In combination with an interchangeable lens camera having a focusing means, a view finder having an adjustable element for adjusting the size of the field thereof to correspond to lenses of different focal lengths, a range finder having a light deviating means coupled to the focusing means said coupling being adjustable to correspond to lenses of different focal lengths and a single manually operable means engaging the adjustable element and said coupling for simultaneously adjusting the coupling and the view finder element in predetermined relation.

2. In combination, a camera, a camera focusing means, a range finder having a light deviating means, adjustable means coupling the light deviating means to a camera focusing means, an adjustable view finder having an axially movable element for varying the size of the field thereof and a single manually operable means engaging the movable element and said coupling means for simultaneously adjusting both in predetermined relation.

JOSEPH MIHALYI.